United States Patent
Mae et al.

(10) Patent No.: US 7,470,205 B2
(45) Date of Patent: Dec. 30, 2008

(54) VEHICULAR DRIVE APPARATUS

(75) Inventors: Norihiro Mae, Anjo (JP); Kenji Omote, Anjo (JP); Satoru Wakuta, Anjo (JP); Kazuhisa Ozaki, Anjo (JP); Kinya Yoshii, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 11/368,605

(22) Filed: Mar. 7, 2006

(65) Prior Publication Data

US 2006/0219051 A1 Oct. 5, 2006

(30) Foreign Application Priority Data

Mar. 7, 2005 (JP) ............................ 2005-062735

(51) Int. Cl.
*F16H 31/00* (2006.01)
(52) U.S. Cl. ........................................ 475/116; 475/5
(58) Field of Classification Search .................. 475/5, 475/146, 116; 192/87.15, 219.5
See application file for complete search history.

(56) References Cited

U.S. PATENT DOCUMENTS

| 4,753,132 | A | * | 6/1988 | Sumiya et al. | ............... | 475/146 |
| 5,269,201 | A | | 12/1993 | Uematsu | | |
| 6,835,158 | B2 | * | 12/2004 | Sugiura et al. | ............... | 475/281 |

FOREIGN PATENT DOCUMENTS

| JP | A-60-249732 | 12/1985 |
| JP | U-3-107562 | 11/1991 |
| JP | A-5-172222 | 7/1993 |
| JP | A 05-172222 | 7/1993 |
| JP | A-9-280328 | 10/1997 |
| JP | A 09-280328 | 10/1997 |
| JP | A-2004-249943 | 9/2004 |

* cited by examiner

*Primary Examiner*—Charles A Marmor
*Assistant Examiner*—Derek D Knight
(74) *Attorney, Agent, or Firm*—Oliff & Berridge, PLC

(57) ABSTRACT

A vehicular drive apparatus includes a case, a first brake having a first friction plate set and a second brake having a second friction plate set wherein the first friction plate set and the second friction plate set are sequentially arranged on a single axis, and a first hydraulic servo arranged to correspond to the first brake and a second hydraulic servo arranged to correspond to the second brake.

12 Claims, 8 Drawing Sheets

BRAKE APPLICATION CHART

|    | B-1 | B-2 |
|----|-----|-----|
| Lo |     | O   |
| Hi | O   |     |

VEHICULAR DRIVE APPARATUS

CROSS-REFERENCE TO RELATED APPLICATION

The disclosure of Japanese Patent Application No. 2005-062735, filed on Mar. 7, 2005, including the specification, drawings and abstract is incorporated herein by reference in its entirety.

BACKGROUND

The present invention relates to a vehicular drive apparatus.

A typical automatic transmission mounted in a vehicle or a typical hybrid drive system mounted in a hybrid vehicle includes a plurality of clutches and brakes that apply and release based on an application pressure supplied to a hydraulic servo in a case of the apparatus. In these apparatuses, the transmission path of a driving force from an internal combustion engine (hereinafter simply referred to as "engine") or an electric motor through a planetary gear unit is changed according to the timely operation of the clutches and brakes. As a result, the rotation speed and torque are changed as they are transmitted to driven wheels at the end of the transmission path.

One known automatic transmission having such a configuration has a cutout or an open portion formed in a peripheral surface of a piston member of a hydraulic servo of the automatic transmission. The cut out and the open portion are for inserting a speed detecting rotation sensor from outside the case (see Japanese Patent Application Publication No. JP-A-05-172222, for example).

In the automatic transmission disclosed in Japanese Patent Application Publication No. JP-A-05-172222, when the piston member pushes against a set of a plurality of friction plates sequentially arranged in the axial direction inside the case, the piston load increases at the two end portions of the open portion in the peripheral surface of the piston member. This may affect the surface pressure distribution when the piston member pushes against the friction plate set. In the automatic transmission disclosed in Japanese Patent Application Publication No. JP-A-05-172222, however, because a separate brake is not arranged to race the friction plate that is set to be pushed by the piston member described above, no spline grooves are located on the opposite side of a backup plate of the friction plate set from the piston. As a result, the effect on the surface pressure distribution will not become worse when the piston member pushes against the friction plates.

In contrast to this, there exists an automatic transmission that has a brake structure with friction plate sets arranged opposing one another in the axial direction inside a case. The friction plate set of one brake is received by a snap-ring and the friction plate set of the other brake is received by a backup plate (see Japanese Patent Application Publication No. JP-A-09-280328, for example).

With a structure such as that of the automatic transmission disclosed in Japanese Patent Application Publication No. JP-A-09-280328, however, for example, when the friction plates of the other brake are being pushed, the back surface of the backup plate of the other brake (that is to be supported by the case surface) is not able to be supported evenly. This occurs because there are spline grooves for spline-engaging the friction plates of the one brake on a side of the back surface of the friction plates of the other brake that are being pushed. For example, when considering this with the structure disclosed in Japanese Patent Application Publication No. JP-A-05-172222, when the friction plate set having the backup plate where the back surface is not evenly supported is pressed against by the piston member having the cutout or open portion in the peripheral surface, there may be a significantly adverse effect on the surface pressure distribution at the area of the backup plate that is being pressed against by the portion corresponding to the cutout or open portion of the piston member.

That is, the presence of the open portion of the piston member reduces the rigidity of the portion corresponding to that open portion, but the rigidity of the other portions does not change. Accordingly, the amount of deformation of the open portion changes with respect to the portions other than the open portion such that there is a difference in deformation amount. In particular, the boundary portion between a portion with low rigidity and a portion with high rigidity deforms. At this time, the stress acting on the deformed portion increases and causes the deformation state to change compared with other portions. As a result, problems such as the friction material peeling away from the disc may occur due to deterioration of the surface pressure distribution of the piston member.

SUMMARY

The present invention thus provides, among other things, a vehicular drive apparatus that solves the foregoing problems by having a structure that enables deterioration of surface pressure distribution, when the friction plates are being pushed, to be reduced as much as possible even when two brakes that each have a friction plate set sequentially arranged in the axial direction are provided within a case and a piston member of a hydraulic servo for pushing the friction plate set of one of the brakes has an open portion. In other words, the disclosure relates to a vehicular drive apparatus that has been improved so that unevenness in surface pressure when pressure is applied to friction plates is able to be reduced, for example, unevenness in the surface pressure that occurs due to the shape of a pressure apply portion of a hydraulic servo and a brake device.

A vehicular drive apparatus according to a first exemplary aspect is structured to include a case, a first brake having a first friction plate set and a second brake having a second friction plate set wherein the first friction plate set and the second friction plate set are sequentially arranged on a single axis, and a first hydraulic servo arranged to correspond to the first brake and a second hydraulic servo arranged to correspond to the second brake. A piston member of the second hydraulic servo is substantially drum-shaped and extends in an axial direction, and has an open portion in a portion of a peripheral surface thereof. The case has a first spline and a second spline formed continuously on an inside surface of the case such that an inside diameter dimension on a second brake side is larger than an inside diameter dimension on a first brake side in order to engagingly support the first friction plate set and the second friction plate set that includes a backup plate of a larger diameter than a plate of the first friction plate set, the first friction plate set and the second friction plate set being inserted and arranged in order on one side in the axial direction. A pressure receiving surface that supports the backup plate of the second friction plate-set that is pushed by the piston member is formed, instead of spline grooves of the first spline, in a position corresponding to at least one of two circumferential ends of the open portion during abutment of the piston member, on a boundary portion between the two splines.

BRIEF DESCRIPTION OF THE DRAWINGS

Various embodiments of the invention will be described with difference to the drawings, wherein;

FIG. 1 is a view showing a transmission to which the present invention can be applied, with FIG. 1A being a schematic diagram, FIG. 1B being a brake application chart, and FIG. 1C being a velocity diagram;

DETAILED DESCRIPTION OF EMBODIMENTS

Figure 1A:
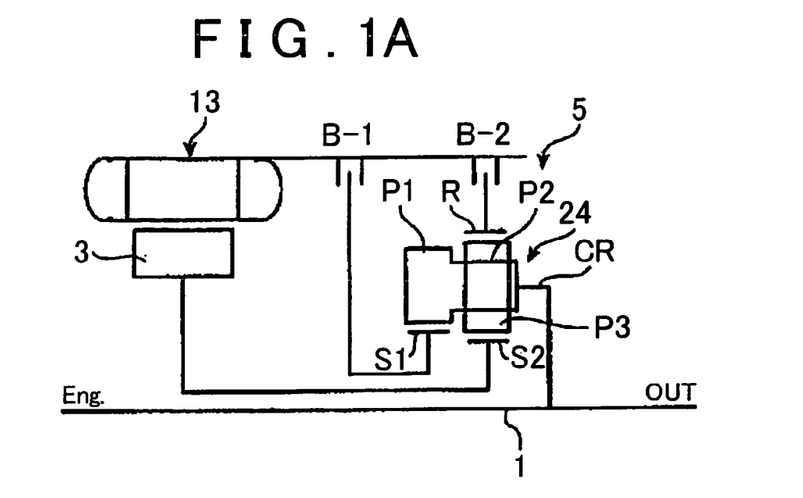
Figure 1B:
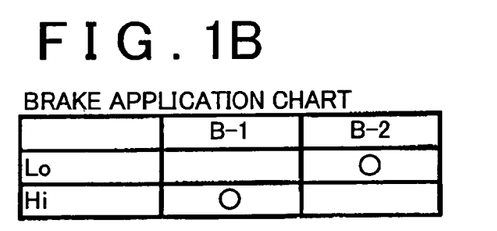
Figure 1C:
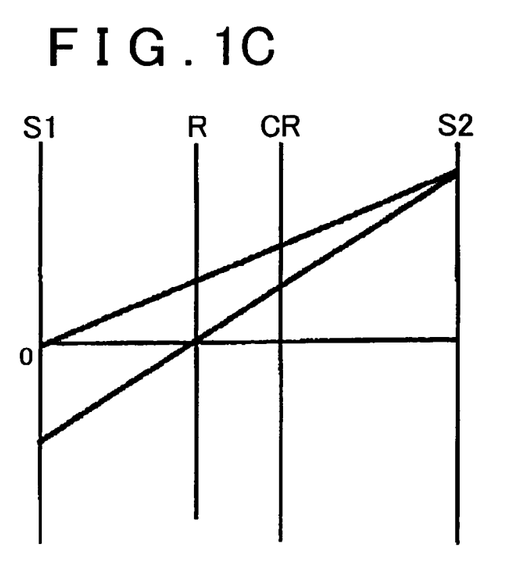

Hereinafter an example embodiment of the present invention will be described with reference to the accompanying drawings. FIG. 1 schematically shows the configuration of a gear train in a hybrid drive system mounted in a FR (i.e., front-engine rear-drive, but in this specification it will simply be referred to as "FR") type vehicle, with FIG. 1A being a schematic diagram, FIG. 1B being a brake application chart, and FIG. 1C being a velocity diagram.

This hybrid drive system (i.e., vehicular drive apparatus) 10 includes a power distributing planetary gear, not shown. Output from an internal combustion engine is transmitted to a first element (such as a carrier) of the planetary gear. A control motor is connected to a second element (such as a sun gear), and an output shaft is connected to a third element (such as a ring gear). Output from the internal combustion engine is shifted steplessly by controlling the control motor, and then output to an output shaft 1. Also, a rotor 3 of a drive motor 13 is connected via a transmission 5 to the output shaft 1. The term "internal combustion engine" in this example embodiment refers to an engine that burns fuel and converts the resultant energy to rotary motion, and includes gasoline engines, diesel engines and the like. Also, the motor in the present invention is not limited to the so-called narrow definition of a motor which simply converts electric energy into rotary motion, but also includes so-called generators that convert rotary motion into electric energy.

The transmission 5 includes a so-called Ravigneaux type planetary gear unit 24, which, as shown in FIG. 1A, has two sun gears S1, S2, two sets of planetary pinion gears: short P3 and long P1, P2, which are contained in a single planet carrier, and one ring gear R. The long pinion includes two pinions P1 and P2 which have a different number of teeth. That is, a common carrier CR supports the long pinion and a short pinion P3. The large diameter pinion P1 of the long pinion is in mesh with a first sun gear S1 and the short pinion P3 is in mesh with the small diameter gear P2 of the long pinion, a second sun gear S2, and a ring gear R. The second sun gear S2 is connected to the rotor 3 of the drive motor 13, the carrier CR is connected to the output shaft 1, the first sun gear S1 is connected to a first brake B-1, and the ring gear R is connected to a second brake B-2.

The transmission 5 operates as illustrated in the brake application chart in FIG. 1B and the velocity diagram in FIG. 1C. That is, in a Low mode (i.e., in low speed), the first brake B-1 is released and the second brake B-2 is applied. As a result, the ring gear R is held stationary. As such, when the second sun gear S2 is rotated by the drive motor 13, the carrier CR rotates at a greatly reduced speed while the first sun gear S1 rotates idly backwards. This rotation of the carrier CR is output to the output shaft 1. In a High mode (i.e., in high speed), the first brake B-1 is applied and the second brake B-2 is released. As a result, the first sun gear S1 is held stationary. As such, the second sun gear S2 is rotated by the drive motor 13, the carrier CR rotates at a slightly reduced speed while the ring gear R rotates idly. This rotation of the carrier CR is output to the output shaft 1.

Figure 2:
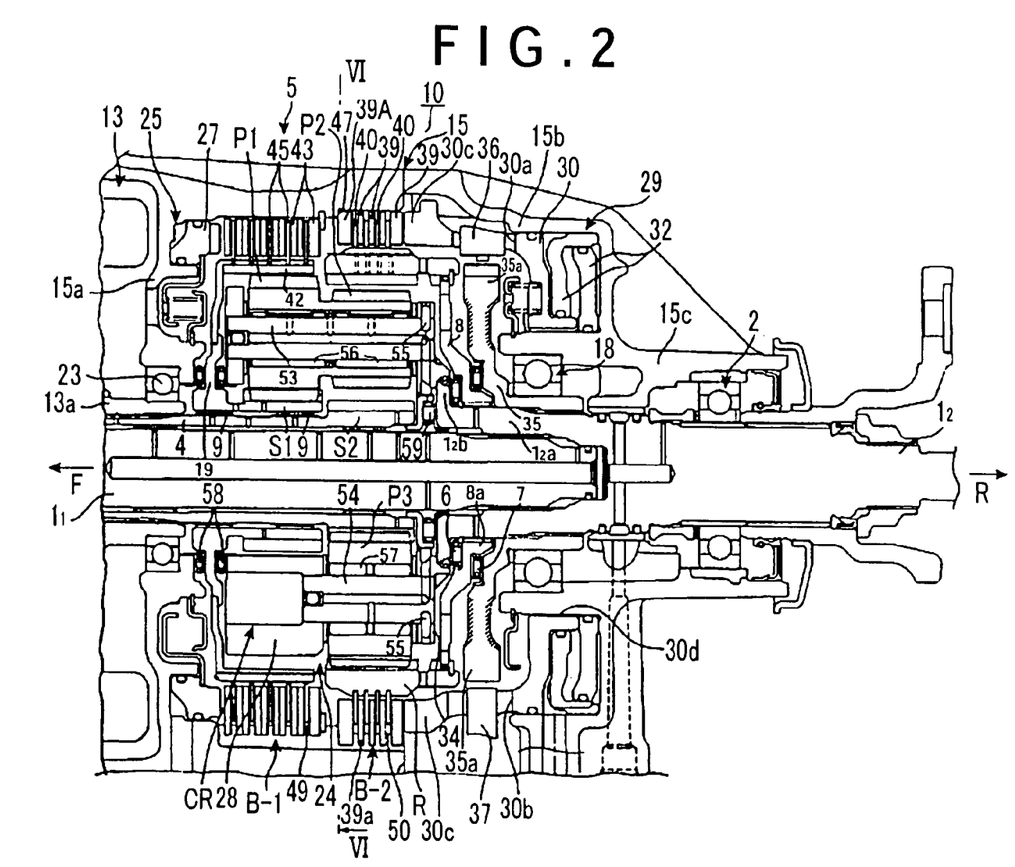
FIG. 2 is a sectional view of the main portions of a hybrid drive system, including the transmission, cut in the axial direction.

FIG. 2 is a sectional view showing the main portions of the hybrid drive system 10, including the transmission 5, cut in the axial direction. Arrow F in FIG. 2 points toward the front (i.e., the engine side) of the vehicle and arrow R points toward the rear (i.e., the differential mechanism side) of the vehicle.

The hybrid drive system 10 includes the drive motor 13 and the transmission housed adjacent to one another inside a case 15. A rotor shaft 13a of the drive motor 13 is rotatably supported via a bearing 23 by a partition 15a of the case 15. A sleeve shaft 4 is integrally connected by splines to the rotor shaft 13a. A front output shaft 1 from the power distributing planetary gear extends through a hollow portion of the sleeve shaft 4 and the rotor shaft 13a which are both hollow shafts. An output shaft 12 is integrally connected by splines to the rear portion of the front output shaft $1_1$. These output shafts $1_1$ and $1_2$ form rotating shafts that are arranged in the center of the planetary gear unit 24. The output shaft $1_2$ is rotatably supported via bearings 18 and 2 and by a boss portion 15c of a rear wall 15b of the case 15.

A parking gear 35 for detecting output rotation speed is spline-engaged, on the same axis as the output shafts $1_1$ and $1_2$, between the bearings 18 with the outer peripheral surface of an insert portion $1_2a$ where the front output shaft $1_1$ inserts into the output shaft $1_2$. The front end portion of the output shaft insert portion $1_2a$ is a flange $1_2b$. A ring gear support plate 8 is arranged, via thrust bearings 6 and 7 on the left and right, between the flange $1_2b$ and the parking gear 35. The ring gear R is supported on the outer periphery of the support plate 8 by spline engagement so as not to slip off. The inner periphery of the support plate 8 is boss-shaped and the support plate 8 is rotatably supported by the output shaft $1_2$ with the boss portion 8a. Accordingly, the ring gear R is stably supported. Supporting the ring gear R with high precision reduces the noise produced by gear mesh in the planetary gear unit 24. Reference character 35a in FIG. 2 denotes a tooth portion of the parking gear 35.

A second brake B-2 that includes a plurality of inner friction plates (discs) 40 and outer friction plates (plates and a backup plate) 39 and 39A interposed between, and spline-engaged with, outer splines formed on the outer peripheral surface of the ring gear R and inner splines formed on the inner peripheral surface of the case 15. The second brake B-2 and the ring gear R are arranged overlapping in the axial direction.

A hydraulic actuator (a second hydraulic servo) 29, which has a double piston 32, is provided on the inside of the case rear wall 15b. A pressure apply portion (i.e., a piston member) 30 of the actuator 29 is generally drum-shaped extending in the axial direction and is guided by a guide protrusion 30e (see FIG. 4), which prevents rotation, with respect to the case 15. The pressure apply portion 30 is slidably supported in the directions of arrows F and R in the axial direction in FIG. 2, with a front end portion 30c thereof facing one side surface (i.e., the right end outer friction plate 39 in FIG. 2) of the second brake B-2.

Figure 4:
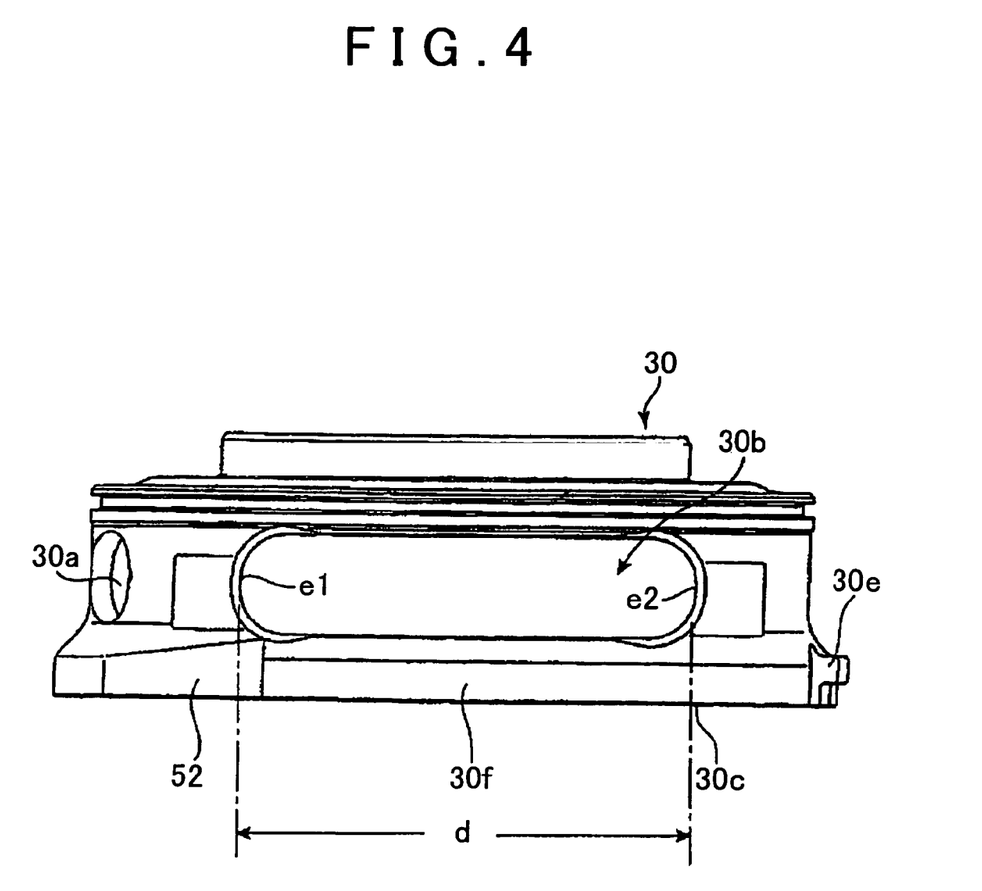
FIG. 4 is a bottom view of a pressure apply portion of a hydraulic actuator as a second hydraulic servo as viewed from below FIG. 3.

As shown in FIGS. 2 and 4, a circular hole 30a and an open portion 30b that is somewhat long in the circumferential direction are formed in the outer peripheral surface of the pressure apply portion 30. The circular hole 30a is a hole into which a tip end of a rotation speed detecting sensor 36 is to be inserted so that it faces the tooth portion 35a of the parking gear 35 inside the pressure apply portion 30. The open portion 30b, that is somewhat long in the circumferential direction, is for inserting a parking pole 37 which sticks into the pressure apply portion 30 in response to a parking operation by, for example, a driver and engages with the tooth portion 35a of the parking gear 35 so as to brake the parking gear 35. The portion denoted by reference numeral 52 in FIG. 4 is a concave portion that is formed to avoid interference between the pressure apply portion 30 and the outer peripheral portion. The portion denoted by reference character 30f is the area corresponding to the front side (i.e., the bottom side in FIG. 4) of the open portion 30b in the front end portion 30c. Also, reference characters e1 and e2 denote reinforced portions where both end portions in the circumferential direction of the open portion 30b are formed thicker in the radial direction, and are thus stronger, than other portions.

The parking pole 37 is provided on a parking device, not shown, that is interposed in the power transmission path to driven wheels, also not shown, of the hybrid drive system 10. When a shift lever provided at a driver's seat of a vehicle having the drive apparatus 10 is shifted into the parking range, the parking pole 37 engages with the parking gear 35 so as to restrict rotation of the driven wheels, not shown, in a neutral state in which the transmission of power from the drive motor 13 or the engine, not shown, to the output shafts $1_1$ and $1_2$ and a propeller shaft, also not shown, is interrupted.

Further, the transmission 5 is arranged between the partition 15a and the rear wall 15b of the case 15. This transmission 5 includes the Ravigneaux type planetary gear unit 24 and the first and second brakes B-1 and B-2, as described above. The first sun gear S1 of the planetary gear unit 24 is rotatably fitted to the outer periphery of the sleeve shaft 4 via bushes 9 and 9. The front end side of the first sun gear S1 is a flange 19.

A flange portion of a drum 42 of the first brake B-1 is integrally fixed by welding to the flange 19. The first brake B-1 which includes a plurality of inner friction plates (discs) 45 and outer friction plates (plates) 43 is interposed between, and spline-engaged with, outer splines formed on the outer peripheral surface of the drum 42 and inner splines formed on the inner peripheral surface of the case 15. A hydraulic actuator (a first hydraulic servo) 25 which includes a single piston 27 is provided on one side surface of the case partition 15a. A pressure apply portion of the piston 27 faces one side surface of the first brake B-1. Also, the second sun gear S2 is formed on the outer periphery of the rear end portion of the sleeve shaft 4.

The carrier CR of the planetary gear unit 24 is disposed at a portion between the flange 19 of the first sun gear S1 and the ring gear support plate 8. The carrier CR is formed of carrier main body 28 and a carrier cover 34 which are integrally connected. A long pinion shaft 53 and a short pinion shaft 54 are supported in alternating fashion across the main body 28 and the cover 34. There are four of each of these shafts 53 and 54, making a total of eight, arranged in the circumferential direction. All of these shafts are prevented from rotating on the carrier CR by pins 55. A long pinion, in which the two pinions P1 and P2 that have a different number of teeth are integrally formed, is rotatably supported on each shaft 53 via needle bearings 56 and 56, while each of the single short pinions P3 is rotatably supported via a needle bearing 57 on each shaft 54.

A thrust bearing 58 is interposed between the left side surface of the sun gear flange 19 and the side surface of the case partition 15a. Another thrust bearing 58 is interposed between the right side surface of the sun gear flange 19 and the carrier main body 28. These bearings 58 and 58 and the thrust bearings 6 and 7 position, and stably support, the carrier CR, the first sun gear S1, and the ring gear R in the axial direction with respect to the case 15. Also, a thrust bearing 59 is interposed between the rear end surface of the sleeve shaft 4 and the front end surface of the flange $1_2b$ of the output shaft insert portion $1_2a$, which positions the sleeve shaft 4 on which the second sun gear S2 is formed in the axial direction. These thrust bearings stably support the entire planetary gear unit 24 in the axial direction with respect to the case 15 such that highly precise mesh between the gears is maintained. The inner peripheral portion of the carrier cover 34 is integrally connected to the flange $1_2b$ of the output shaft $1_2$ by welding.

Next, the friction plate support structure of the hybrid drive system 10 according to this example embodiment will be described in detail with reference to FIGS. 2 to 7. The friction plate support structure serves to prevent problems such as stress being applied unevenly when pressure is applied to the second brake B-2 by the front end portion 30c corresponding to the open portion 30b, due to the fact that the open portion 30b is formed on the peripheral surface of the pressure apply portion (i.e., the piston member) 30 of the hydraulic actuator 29 that has the double piston 32.

That is, in this example embodiment, reinforced portions e1 and e2 (see FIGS. 3 and 4) are formed on the front end portion 30c of the pressure apply portion 30. However, the following structure is provided to reduce unevenness in the load when there is pressure against which the reinforced portions e1 and e2 alone are insufficient.

In other words, the friction plate support structure in this example embodiment has first and second brakes B-1 and B-2 having first and second friction plate sets, respectively, sequentially arranged on a single axis inserted from the same direction (i.e., from the right side in FIG. 2) into the case 15. More specifically, the first brake B-1 which has a first friction plate set that includes outer friction plates 43 and inner friction plates 45, and the second brake B-2 which has a second friction plate set that includes outer friction plates 39, a backup plate 39A, and inner friction plates 40, are arranged in the case 15 so as to face each other in the axial direction of the output shaft 1. Hydraulic actuators 25 and 29 are arranged corresponding to the first and second brakes B-1 and B-2, respectively, on opposite sides in the axial direction so as to sandwich the first and second friction plate sets. The phrase "sequentially arranged on a single axis" refers to being aligned in such a manner that they are in different positions in the axial direction about the same axis (i.e., about the same output shaft 1).

Figure 3:
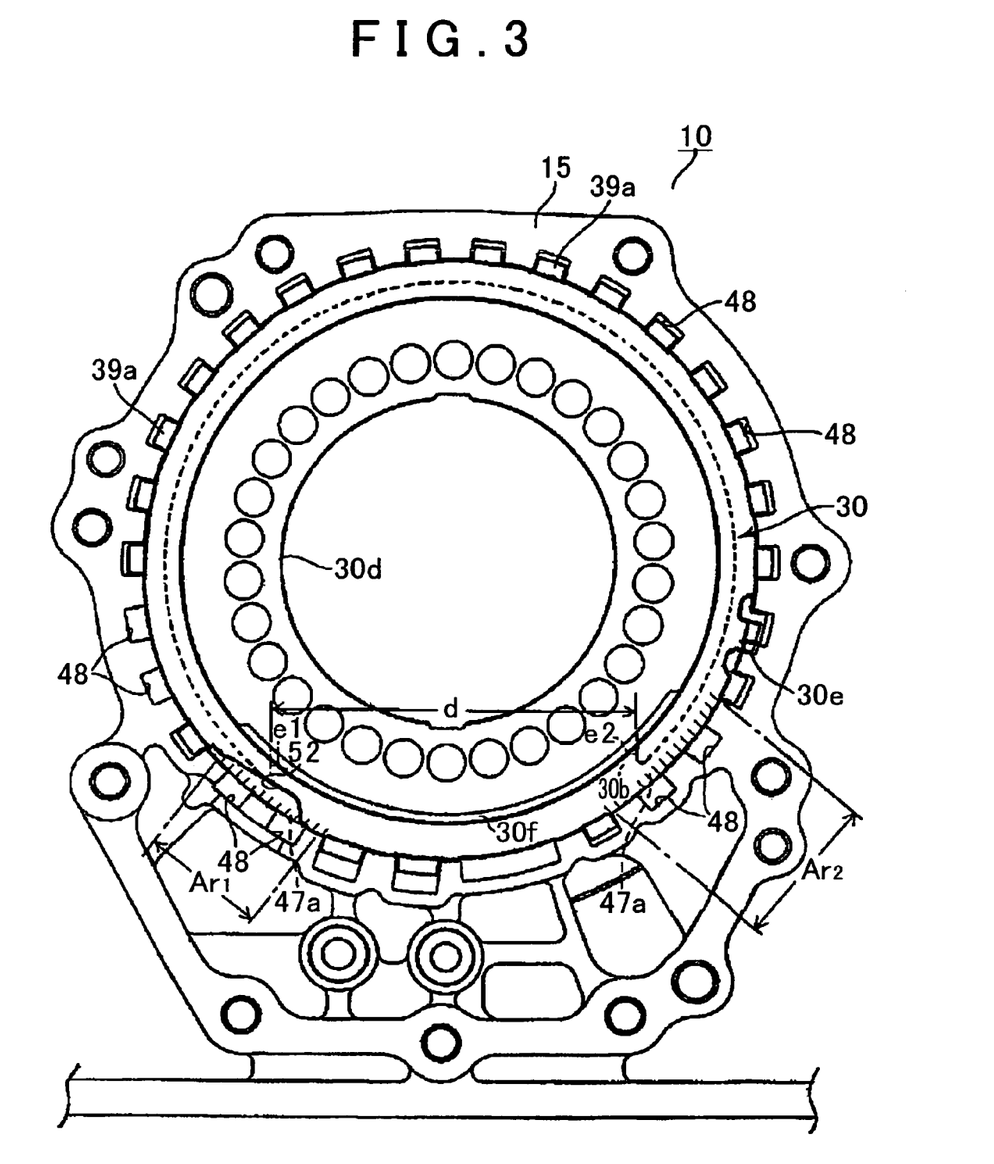
FIG. 3 is a view of a friction plate support structure according to the example embodiment as viewed from the rear of the transmission with the rear wall removed.

Further, the pressure apply portion 30 of the hydraulic actuator 29 is formed generally drum-shaped extending in the axial direction and has an open portion 30b in part of its peripheral surface, as described above. As shown in FIG. 3, the open portion 30b is formed extending through the front and back of the pressure apply portion 30 so that it has a predetermined circumferential width d. Reference character 30d in FIG. 3 denotes a circular hole into which the boss portion 15c is to be fitted.

First and second splines are formed continuously on the inside surface of the case 15 such that the inside diameter dimension D2 (see FIGS. 5 and 6) on the second brake B-2 side is larger than the inside diameter dimension D1 (see FIG. 6) on the first brake B-1 side. The inside diameter dimensions are made different in this way in order to engagingly support the first friction plate set and the second friction plate set, including the backup plate 39A that has a larger diameter than the outer friction plates 43 of the first friction plate set, both of which are inserted and arranged in order on one side (i.e., the left side in FIG. 2) in the axial direction. The first splines include spline grooves 48 and inner peripheral tang portions 49 (see FIG. 6), and the second splines include the spline grooves 48 and inner peripheral tang portions 50 (see FIG. 6).

Figure 6:
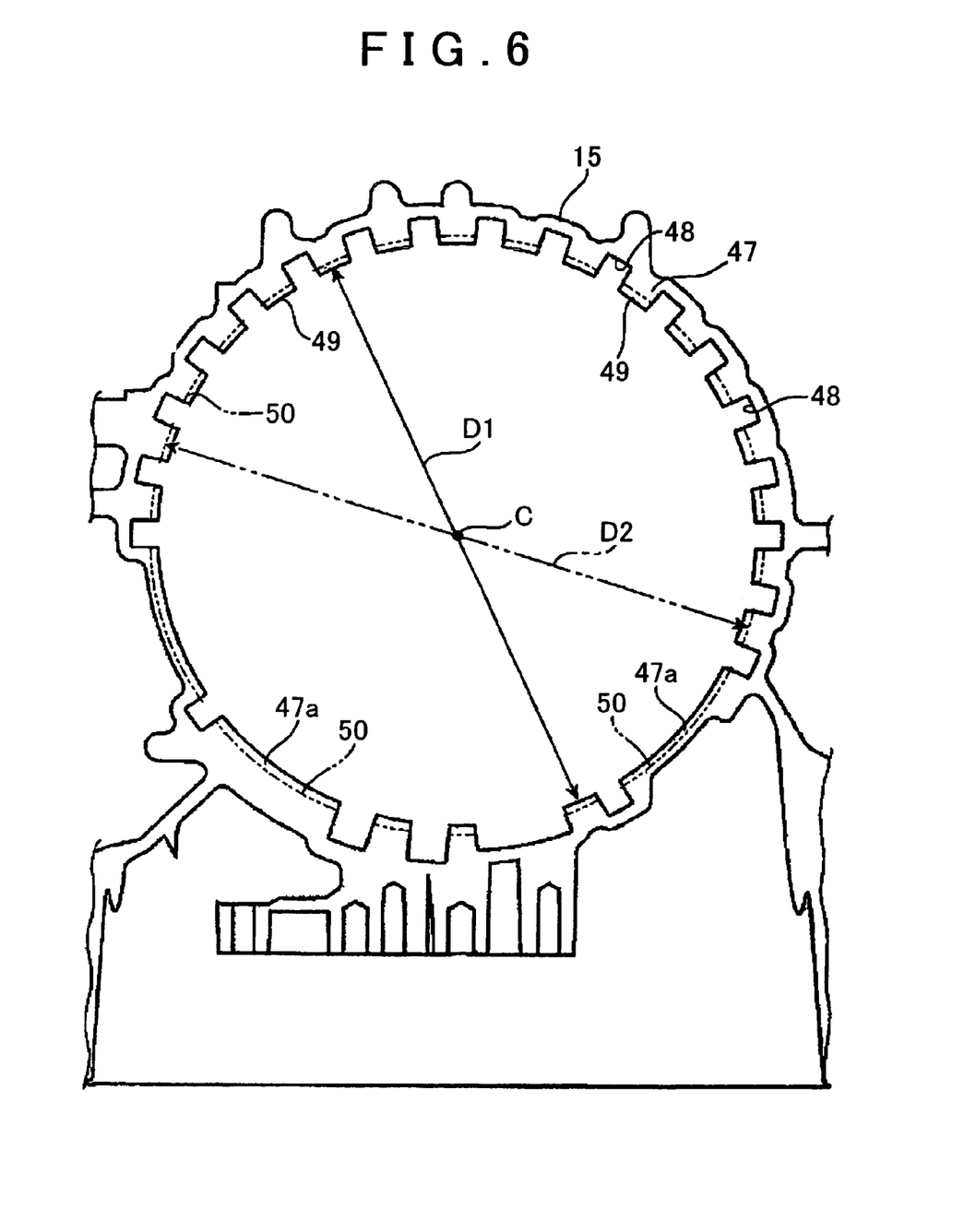
FIG. 6 is a sectional view taken along line VI-VI in FIG. 2.

FIG. 6 is a sectional view taken along line VI-VI in FIG. 2. As shown in the drawing, a plurality of the spline grooves 48 of the continuous first and second splines are formed parallel with each other in the axial direction on the inside surface of the case 15. Further, the inner peripheral tang portions 50 are formed from a boundary portion 47 midway in the axial direction such that the inside diameter dimension D2 is larger than the inside diameter dimension D1 on the inner peripheral tang portion 49 side. The term "inside diameter dimension" here refers to the inside diameter (diameter) D1 of the inside surface of the case 15, excluding the spline grooves 48 with which spline teeth, not shown, of the outer friction plates 43 are to engage on the first brake B-1 side, i.e., the distance between opposing inner peripheral tang portions 49. The term also refers to the inner diameter (diameter) D2 of the inside surface of the case 15, excluding the spline grooves 48 with which the spline teeth 39a (see FIG. 3) are to engage on the second brake B-2 side, i.e., the distance between opposing inner peripheral tang portions 50.

When viewed from the rear side of the hybrid drive system 10 (i.e., from the right side in FIG. 2), the spline grooves 48, with which the spline teeth 39a of the backup plate 39A and the other outer friction plates 39 are to engage, are formed near the reinforced portions e1 and e2 of the circumferential ends of the open portion 30b on the inside surface of the case 15 to the rear side (i.e., the side of arrow R in FIG. 2) of the boundary portion 47, as shown in FIG. 3. However, no spline teeth 39a that are to engage with the spline grooves 48 near those circumferential ends (i.e., reinforced portions e1 and e2) are formed on the backup plate 39A or the outer friction plates 39 according to this example embodiment.

It should be noted that the structure is not limited to the structure illustrated in FIG. 3. For example, it is also possible to have a structure in which the spline grooves 48 with which the spline teeth 39a of the backup plate 39A and the other outer friction plates 39 are to engage are not formed only at one of the two circumferential ends (reinforced portions e1 or e2) of the open portion 30b on the inside surface of the case 15 to the rear of the boundary portion 47, for example, near the circumferential end on the reinforced portion e1 side. In this case as well, substantially similar operational effects as those obtained with the structure in FIG. 3 can be obtained.

Further, pressure receiving surfaces 47a and 47a are formed instead of the spline grooves 48 of the first splines in areas Ar1 and Ar2 in the circumferential direction which are locations corresponding to both circumferential ends (reinforced portions e1 and e2) of the open portion 30b during abutment of the pressure apply portion 30 on the boundary portion 47 (see also FIG. 2) between the first and second splines. These pressure receiving surfaces 47a and 47a support back surface portions (i.e., portions denoted by reference characters 39b and 39c in FIG. 7) of the backup plate 39A of the second friction plate set that is pushed against by the pressure apply portion 30. The slanted lines at areas other than the back surface portions 39b and 39c in FIG. 7 denote back surface portions of the backup plate 39A that are supported near the inner peripheral tang portions 49 of the boundary portion 47.

Figure 5:
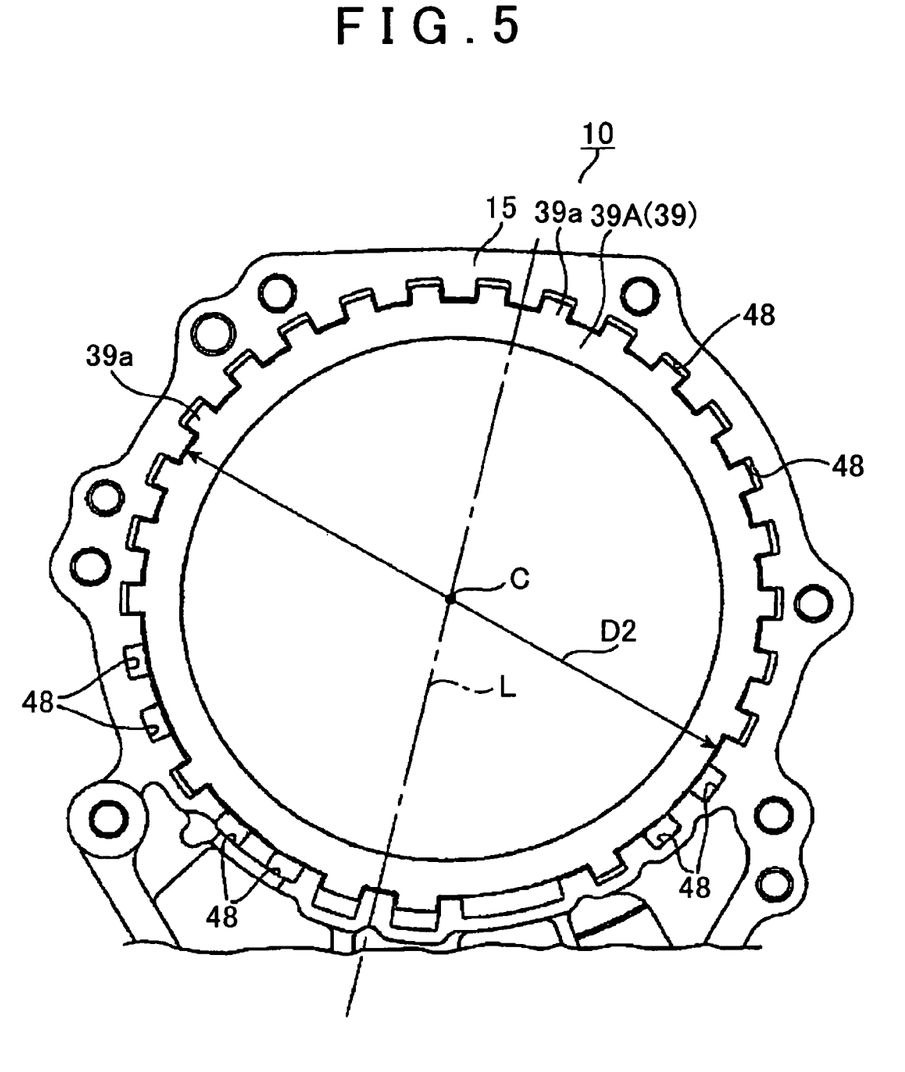
FIG. 5 is a view of the friction plate support structure in FIG. 3 shown with the pressure apply portion as the piston member removed.
Figure 7:
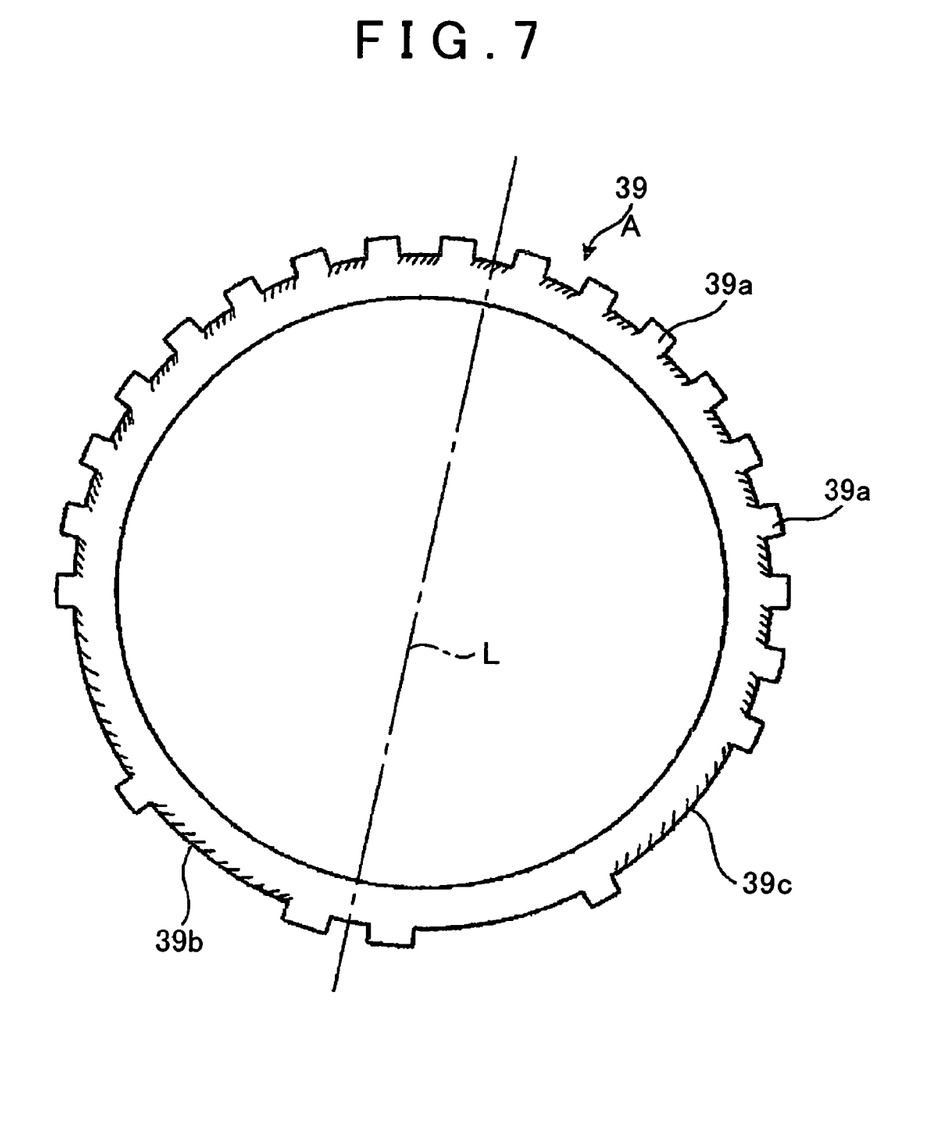
FIG. 7 is a front view showing just the backup plate according to the example embodiment.
Figure 8:
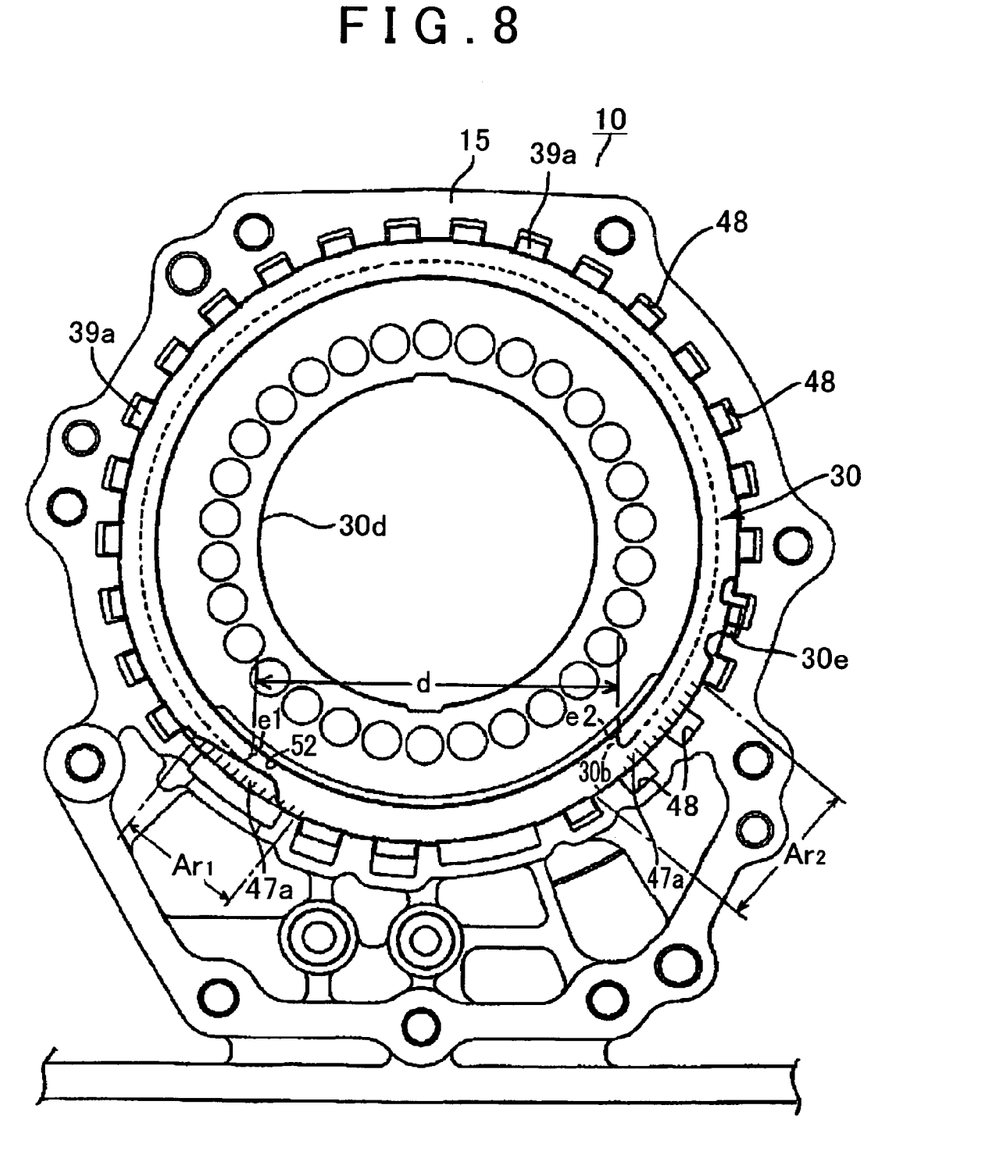
FIG. 8 is a view of a modified example in which part of the friction plate support structure has been modified.

Also, the backup plate 39A and the other outer friction plates 39 are formed so as to be axisymmetrical about an axis line L which is perpendicular to the axial center C of the case 15, as shown in FIGS. 5 and 7. Because the backup plate 39A and the other outer friction plates 39 are axisymmetrical about the axis line L which is perpendicular to the axial center C of the case 15 in this way, it is possible to easily realize the backup plate 39A and the outer friction plates 39 which are suitable for the friction plate support structure of the present invention while making the shapes of those plates relatively simple.

With this structure, the parking gear 35 is arranged to the inside of the pressure apply portion 30 and the parking pole 37 is arranged to the outside of the pressure apply portion 30, as described above. Further, the open portion 30b of the pressure apply portion 30 is configured as an open portion for inserting the parking pole 37 so that it can engage and disengage with the parking gear 35.

The open portion 30b in this example embodiment is not limited to a so-called opening of which the periphery is defined. The opening may of course also be formed as a so-called cutout in which a portion of the periphery of an opening has been cut away.

Next the operation of the hybrid drive system 10 of this example embodiment will be described. When the vehicle is running, the output shafts $1_1$ and $1_2$ rotate. While the drive motor 13 of the transmission 5 is operating and generating output, the sleeve shaft 4 which is integrated with the rotor shaft 13a rotates regardless of whether the drive apparatus is in the Low mode or the High mode.

In this state, when the mode of the transmission 5 changes to the Low mode, the first brake B-1 is released and the second brake B-2 is applied. As a result, the ring gear R is head stationary so as the second sun gear S2 is rotated by the drive motor 13, and the carrier CR rotates at a greatly reduced speed while the first sun gear S1 rotates idly backwards. The rotation of the carrier CR is output to the output shaft 1. When the mode switches to the High mode, the first brake B-1 is applied and the second brake B-2 is released As a result, the first sun gear S1 is head stationary. As such, when the second sun gear S2 is rotated by the drive motor 13, the carrier CR rotates at a slightly reduced speed while the ring gear R rotates idly. This rotation of the carrier CR is output to the output shaft 1.

Here, the pressure receiving surface 47a which supports the backup plate 39A of the second friction plate set that is pushed against by the pressure apply portion 30 is formed, instead of the spline grooves 48 of the first splines, corresponding to at least one of the reinforced portions e1 and e2 of both circumferential ends of the open portion 30b during abutment of the pressure apply portion 30, on the boundary portion 47 between the first and second splines. Accordingly, even if the open portion 30b is formed in the pressure apply portion 30 of the hydraulic actuator 29 that pushes against the second friction plate set while the first and second brakes B-1 and B-2 which both have friction plate sets sequentially arranged on a single axis are provided, the portions corresponding to both circumferential ends (reinforced portions e1 and e2) of the backup plate 39A when pressure is being applied can be adequately supported by the pressure receiving portion 47a, and not the spline grooves as is the case with the related art, when the second brake B-2 is applied in the Low mode.

As a result, deterioration of surface pressure distribution when pressure is applied to the friction plates can be reduced as much as possible so that problems such as the friction material peeling away from the inner friction plates 40 in the second brake B-2 can be reliably prevented. By forming the pressure receiving surface 47a in a location corresponding to at least one of the two circumferential ends (reinforced portions e1 and e2) of the open portion 30b of the pressure apply portion 30, it is possible to make appropriate modifications according to the design, such as forming the pressure receiving surface 47a on both circumferential ends (i.e., on both the reinforced portion e1 side and the reinforced portion e2 side) or only on one end (the reinforced portion e1 side) or the other (the reinforced portion e2 side).

Also, the open portion 30b of the pressure apply portion 30 is an open portion for inserting the parking pole 37 so that it can engage and disengage with the parking gear 35. Therefore, it is possible to realize a friction plate support structure in which the deterioration of surface pressure distribution when pressure is being applied to the friction plates can be reduced as much as possible, even when the open portion 30b necessary for inserting the parking pole 37 is formed in the required location in the pressure apply portion 30.

Further, the second brake B-2 is configured to switch the transmission 5 into low speed and the hydraulic actuator 29 includes a double piston having the pressure apply portion 30. As a result, the torque for braking is large on the low speed side so the load at that time is also large. When the open portion 30b is formed in the pressure apply portion 30, the large load causes the center portion of that open portion 30b to bend, which in turn places a significant amount of stress on the base portions of both circumferential ends (the reinforced portions e1 and e2) of the .open portion 30b. The existence of the pressure receiving surface 47a, however, yields a friction plate support structure that is able to appropriately distribute the surface pressure when pressure is applied to the friction plates. Accordingly, a strong braking force by the double piston 32 on the low speed side is able to be sufficiently displayed.

Further, the first brake B-1 is configured to-switch the hybrid transmission 5 into high speed and the second brake B-2 is configured to switch the hybrid transmission 5 into low speed. Accordingly, an excellent transmission 5 for a hybrid is able to be realized in which the friction plate support structure according to the present invention is arranged in a motive power train.

In this example embodiment, the friction plate support structure is described as a structure corresponding to the open portion 30b into which the parking pole 37 is inserted, but it is not limited to this however. That is, the friction plate support structure can also be a structure corresponding to a portion into which a member other than the parking pole 37 is inserted. Also, the transmission 5 in this example embodiment is not limited to a transmission for changing the output rotation speed of a drive motor of the hybrid drive system as described above, but can of course also be applied to another transmission and even a planetary gear other than a transmission planetary gear.

Also, in the foregoing example embodiment, the first and second brakes B-1 and B-2 which have first and second friction plate sets, respectively, arranged so that they oppose each other in the axial direction within the case 15, were given as an example configuration of the first and second brakes B-1 and B-2 having first and second friction plate sets, respectively, sequentially arranged on a single axis. The present invention is not limited to this, however. For example, the invention can of course also be applied to a configuration in which first and second brakes B-1 and B-2 are provided which have first and second friction plate sets, respectively, sequentially arranged in different positions in the axial direction on the same axis, and these first and second friction plate sets are pushed by separate pistons from the same direction, i.e., from the direction of the second brake B-2.

According to an exemplary aspect of the invention, even when an open portion is formed in a piston member of a second hydraulic servo that pushes against the second friction plate set when first and second brakes each having a friction plate set sequentially arranged on a single axis are provided, the portion of the backup plate corresponding to the circumferential ends of the open portion when pressure is applied can be appropriately supported by the pressure receiving surface, and not the spline grooves as in the related art. As a result, deterioration of the surface pressure distribution while pressure is being applied to the friction plates can be reduced as much as possible, so problems such as the friction material peeling away from the discs (i.e., from the inner friction plates) can be reliably prevented. By forming the pressure receiving surface in a location corresponding to at least one of the two circumferential ends of the open portion of the piston member, it is possible to make appropriate modifications according to the design, such as forming the pressure receiving surface on both circumferential ends or only on one end or the other.

According to another exemplary aspect of the invention, it is possible to realize a friction plate support structure in which deterioration of surface pressure distribution when pressure is being applied to the friction plates can be reduced as much as possible, even when the open portion necessary for inserting the parking pole is formed in the required location in the piston member.

According to another exemplary aspect of the invention, the open portion is formed in the piston member, this large load causes the center portion of that open portion to bend, which in turn places a significant amount of stress on the base portions of both circumferential ends of the open portion. The existence of the pressure receiving surface, however, yields a friction plate support structure that is able to appropriately distribute the surface pressure when pressure is applied to the friction plates. Accordingly, strong braking force by the double piston on the low speed side is able to be sufficiently displayed.

Accordingly to another exemplary aspect of the invention, it is possible to realize an excellent hybrid transmission in which the friction plate support structure according to the present invention is arranged in the motive power train.

According to another exemplary aspect of the invention, it is possible to realize a backup plate that is suitable for the friction plate support structure of the present invention while making the shape of the backup plate relatively simple.

What is claimed is:

1. A vehicular drive apparatus, comprising:
   a case;
   a first brake having a first friction plate set and a second brake having a second friction plate set, wherein the first friction plate set and the second friction plate set are sequentially arranged on a single axis; and
   a first hydraulic servo arranged to correspond to the first brake and a second hydraulic servo arranged to correspond to the second brake, wherein:

a piston member of the second hydraulic servo is substantially drum-shaped and extends in an axial direction, and has an open portion in a portion of a peripheral surface thereof;

the case has a first spline and a second spline formed continuously on an inside surface of the case such that an inside diameter dimension on a second brake side is larger than an inside diameter dimension on a first brake side in order to engagingly support the first friction plate set and the second friction plate set that includes a backup plate of a larger diameter than a plate of the first friction plate set, the first friction plate set and the second friction plate set being inserted and arranged in order on one side in the axial direction;

a pressure receiving surface that supports the backup plate of the second friction plate set that is pushed by the piston member is formed, instead of spline grooves of the first spline, in a position corresponding to at least one of two circumferential ends of the open portion during abutment of the piston member, on a boundary portion between the two splines;

the first hydraulic servo and the second hydraulic servo are arranged along the axial direction so as to sandwich the first friction plate set and the second friction plate set; and the first spline engagingly supports the first friction plate set and the second spline engagingly supports the second friction plate set.

2. The vehicular drive apparatus according to claim 1, further comprising:

a parking gear provided to an inside of the piston member and a parking pole is provided to an outside of the piston member, wherein:

the open portion of the piston member is an opening for inserting the parking pole such that the parking pole can be engaged and disengaged with the parking gear.

3. The vehicular drive apparatus according to claim 2, further comprising:

a transmission that switches between high speed and low speed while a vehicle is being driven is provided in the case, wherein:

the second brake is configured to switch the transmission into low speed, and the second hydraulic servo includes a double piston in which the piston member serves as a pressure apply portion.

4. The vehicular drive apparatus according to claim 3, wherein the backup plate is structured so as to be axisymmetrical about an axis line that is perpendicular to a center axis of the case.

5. The vehicular drive apparatus according to claim 2, further comprising:

a hybrid transmission that switches a combined driving force from an engine and a motor between a high speed side and a low speed side is provided in the case, wherein:

the first brake is configured to switch the hybrid transmission into high speed and the second brake is configured to switch the hybrid transmission into low speed.

6. The vehicular drive apparatus according to claim 5, wherein the backup plate is structured so as to be axisymmetrical about an axis line that is perpendicular to a center axis of the case.

7. The vehicular drive apparatus according to claim 2, wherein the backup plate is structured so as to be axisymmetrical about an axis line that is perpendicular to a center axis of the case.

8. The vehicular drive apparatus according to claim 1, further comprising:

a transmission that switches between high speed and low speed while a vehicle is being driven is provided in the case, wherein:

the second brake is configured to switch the transmission into low speed, and the second hydraulic servo includes a double piston in which the piston member serves as a pressure apply portion.

9. The vehicular drive apparatus according to claim 8, wherein the backup plate is structured so as to be axisymmetrical about an axis line that is perpendicular to a center axis of the case.

10. The vehicular drive apparatus according to claim 1, further comprising:

a hybrid transmission that switches a combined driving force from an engine and a motor between a high speed side and a low speed side is provided in the case, wherein:

the first brake is configured to switch the hybrid transmission into high speed and the second brake is configured to switch the hybrid transmission into low speed.

11. The vehicular drive apparatus according to claim 10, wherein the backup plate is structured so as to be axisymmetrical about an axis line that is perpendicular to a center axis of the case.

12. The vehicular drive apparatus according to claim 1, wherein the backup plate is structured so as to be axisymmetrical about an axis line that is perpendicular to a center axis of the case.

* * * * *